Aug. 7, 1956   M. E. JORDAN ET AL   2,757,534
MEASUREMENT OF VOLUMES
Filed Sept. 15, 1953
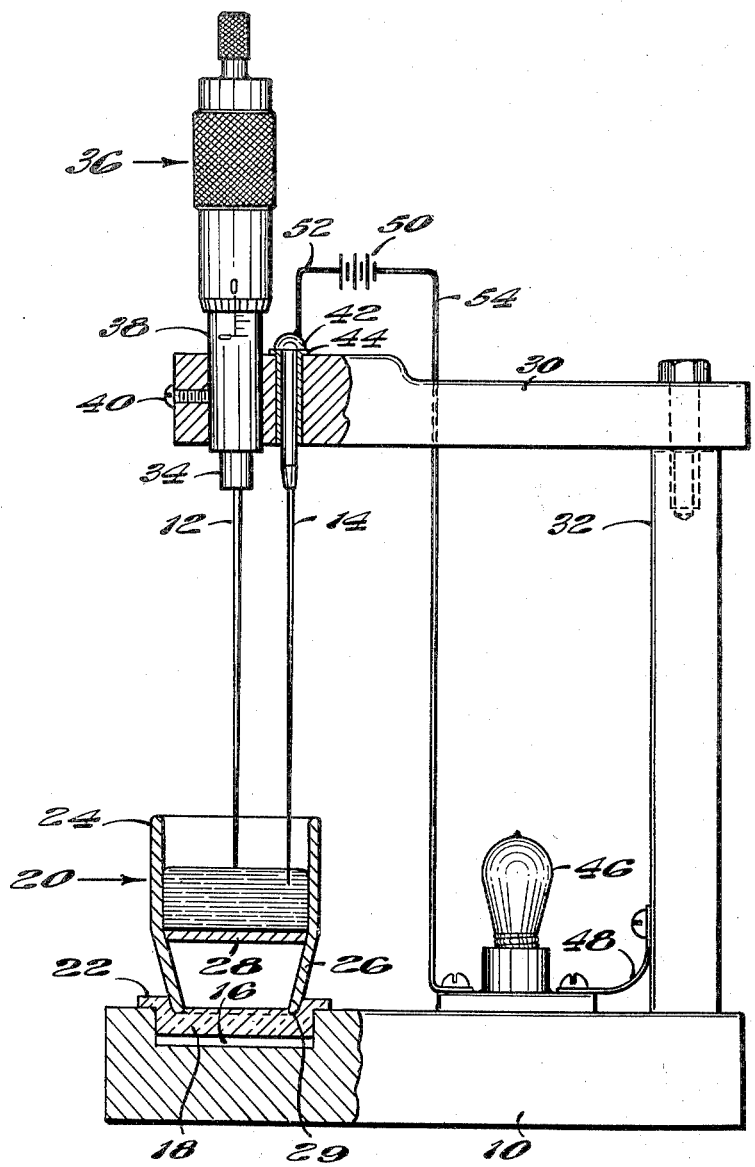
INVENTORS.
Merrill E. Jordan and
Marvin B. Lipowsky
by Kenway, Jenney, Witter & Hildreth
Attys.

United States Patent Office 2,757,534
Patented Aug. 7, 1956

2,757,534

MEASUREMENT OF VOLUMES

Merrill E. Jordan, Walpole, and Marvin D. Lipousky, Roxbury, Mass., assignors to Godfrey L. Cabot, Inc., Boston, Mass., a corporation of Massachusetts Application September 15, 1953, Serial No. 380,188

2 Claims. (Cl. 73—61)

The present invention relates to the measurement of volumes, particularly, the volume of filter residues, and provides a novel apparatus and procedure therefor.

An accurate determination of the volume of filter residues is required in numerous analytical determinations, for example the determination of the critical pigment volume concentration (CPVC) of dispersed systems. The CPVC has been defined by Asbeck and Van Loo in Critical Pigment Volume Relationship, Ind. Eng. Chem. 41, 1470–1475 (1949) as the ratio of the sum of the volume of hiding pigments plus the volume of extenders to the volume of hiding pigments plus the volume of extenders plus the volume of non-volatile vehicle solids at "that point in a pigment vehicle system at which just sufficient binder is present to completely fill the voids left between the pigment particles incorporated in the film after volatilization of all the thinner. It represents the densest packing of particles commensurate with the degree of dispersion of the system."

In the protective and decorative coating industry, the CPVC is becoming of great importance as a means for accurate appraisal, in pigment binder systems, of the effect of such factors as (1) the fundamental packing characteristics of a pigment, (2) the particular binder employed, (3) the type and amount of special agents present, and (4) the particle size of the pigment.

Heretofore, attempted determinations of the CPVC have been made from measurements of the amount of vehicle absorbed by the pigment. However, vehicle absorption figures are relatively unreliable, since variations in individual techniques cause such discrepancies that it is most difficult for one investigator to check the results of another, and frequently it is difficult for an investigator to check himself. The present invention provides an improved means for determining the CPVC in which excess vehicle from a dispersed system is removed, and thereby, the effect of variations in individual techniques is eliminated.

In determining the CPVC according to the present invention, the critical pigment volume conditions of a dispersed system are obtained by filtering the excess vehicle from an aliquot of known pigment volume concentration in a container having a filter bottom, and the volume of the filter residue is determined by measuring the displacement of the surface of a given quantity of a conductive liquid, such as mercury, by measuring the surface level of the liquid in the container before and after the filter residue is collected. The apparatus provided by this invention utilizes a downwardly projecting retractable electrode situated over a base member on which the container may be rested with the electrode extending into it. A filamentary electrode also extends into the container and makes electrical contact with the mercury. The surface level of the mercury may readily be determined by connecting the electrodes across a source of E. M. F. in a circuit including a means for detecting the flow of current, and adjusting the retractable electrode to the point where it just makes contact with the surface of the conductive fluid. From a measurement of the level of the surface of the conductive fluid before and after the filter residue is collected, the surface displacement of the fluid is readily determined, from which the volume of the filter residue is easily calculated. In preferred embodiments of this invention, the base member on which the container is set is provided with configuration adapted to position the container with its center aligned with the retractable electrode so that the surface level of the conductive liquid is always measured at the center of the surface, at which place the surface level as measured is the same regardless of whether the apparatus is maintained accurately leveled.

This invention will best be understood from the following detailed description of the preferred embodiment thereof, reference being made to the drawing which shows in side elevation the apparatus of this invention with parts broken away to reveal structural details.

The apparatus of the preferred embodiment shown in the drawing consists in general of a base member 10, above which are affixed a retractable elongated electrode 12, and a filamentary electrode 14, both of the electrodes being parallel and extending downwardly toward the base. Beneath the electrodes, and preferably centered about the axis of the elongated electrode, a well 16 is formed in the base 10, and a centering cup 18 having an upper surface contoured to accommodate and position a filter container 20 is accommodated within the well 16. The centering cup 18 is conveniently formed of such dimensions to fit snugly within the well and with an outwardly extending peripheral flange 22 resting on the top surface of the base member 10. Inasmuch as filter containers of various types and shapes may be utilized in the practice of this invention, the contour of the upper surface of the centering cup for any particular filter container will be dependent on the size and shape of the container. In the embodiment illustrated, the filter container is shown as a glass vessel having a cylindrical upper section 24 separated from an inwardly tapered lower section 26 by a sintered glass fritted disk 28 fused to the inner wall of the vessel. To accommodate and center a filter container of this type, the upper contour of the centering cup 18 is formed with an annular channel 29 accommodating the bottom edge of the filter 20.

The electrodes 12 and 14 are supported over the base member 10 near the end of an arm 30, preferably of conductive material, extending and secured over the base member through a column 32, also preferably of a conductive material, extending upwardly from the base member to which the column is attached. The elongated retractable electrode 12 is conveniently fastened to the extension rod 34 of a conventional thimble-and-barrel type micrometer 36 mounted by its barrel flange 38 in a hole in the arm 30 in which the barrel flange 38 is firmly held by a set screw 40. The filamentary electrode 14 is fastened at its upper end to a cylindrical stud 42 mounted in a bushing 44 of insulating material situated in a hole in the arm 30 and insulating the filamentary electrode therefrom.

Electrical connections to the two electrodes 12 and 14 are made through the stud 42 and the column 32 respectively, the latter connection being through an indicator lamp 46 by a conductor 48 connecting one terminal of the lamp with the column 32.

In a typical determination of the volume of a filter residue, a container having a filter bottom, for instance a conventional fritted glass crucible, is first positioned on the centering cup 18 with the two electrodes 12 and 14 extending into it. A quantity of mercury is then poured into the container until the end of the filamentary electrode 14 is immersed. With the electrodes 12 and 14 connected across a source of electric current, for instance a battery 50 through a conductor 52 connecting one side of the battery with the stud 42 and a conductor 54 connecting the other side of the battery to the indicator lamp 46, the elongated electrode 12 is lowered by rotating the thimble of the micrometer 36 until the end of the elongated electrode makes contact with the surface of the mercury. This instant of the making of contact with the surface of the mercury is readily detected by the illumination of the indicator lamp 46.

The mercury is then poured from the filter container 20 and set aside for future use. A measured quantity of the dispersion is then filtered through the filter container, the filter residue collecting on the upper surface of the fritted disk 28, and the mercury is poured over the filter residue and the measurement of its level again determined in the same manner. The difference in the micrometer readings taken before and after the filter residue is collected, represents the surface displacement of the mercury due to the volume of the filter residue which may be determined by multiplying that difference by the cross-sectional area of the filter container at the mercury level.

An alternative means of determining the volume of the filter residue is by slowly introducing the mercury into the filter container after the filter residue is collected until its surface comes into contact with the elongated electrode in its original set position. At this point, the volume of mercury unreturned to the filter container is the same as the volume displaced by the filter residue, and this may be accurately measured either volumetrically or gravimetrically.

In utilizing measurements made in the manner described above to determine the critical pigment volume content of a pigment vehicle system, the pigment is added to the vehicle and dispersed therein. The unbound oil is separated from pigment and bound oil by filtration at reduced pressure. This leaves a filter cake whose volume is the sum of the pigment volume plus bound oil volume. The dispersion when filtered to the point when a dull appearance first develops on the surface of the residue is at the critical pigment volume concentration. The critical pigment volume concentration may accordingly be calculated by dividing the volume of the pigment by the volume of the filter residue, the latter having been determined by the manner outlined above.

Having thus disclosed our invention, we claim and desire to secure by Letters Patent:

1. Apparatus for measuring volume change, comprising a container having a porous bottom adapted for the filtration of liquids from solids-liquid mixtures with mercury floating thereon, a base, a standard mounted on said base having secured thereto a supporting arm overhanging said container, a fixed electrode and a longitudinally adjustable electrode depending vertically out of contact with each other from said arm and both extending into the said container, the adjustable electrode being positioned approximately in the vertical axis of the container, means including an indicator, to provide an electric current through the electrodes upon contact of the extremities thereof with the mercury, and means to indicate the distance of vertical travel of the adjustable electrode corresponding to variation of mercury level.

2. Apparatus for measuring the volume of residual filter cakes, comprising a container having a filter disk therein for collecting filtered residue from a pigment dispersion and for supporting above such residue a body of mercury, a base holding said container and a standard mounted on the base, a micrometer carried by the base and located vertically above the filter disk, a pair of electrodes also carried by the standard, one electrode being operatively connected to the micrometer, an electric circuit including said electrodes, and an indicator included in said circuit for indicating contact of the micrometer-connected electrode with the body of mercury.

References Cited in the file of this patent

UNITED STATES PATENTS

| | | |
|---|---|---|
| 1,663,306 | Hutchison | Mar. 20, 1928 |
| 2,270,505 | Burleson | Jan. 20, 1942 |
| 2,445,200 | Wolfe | July 13, 1948 |
| 2,505,812 | Theimer | May 2, 1950 |
| 2,691,298 | Cook | Oct. 12, 1954 |

FOREIGN PATENTS

| | | |
|---|---|---|
| 237,247 | Germany | Aug. 3, 1911 |
| 237,635 | Germany | Aug. 25, 1911 |